W. A. LORENZ.
DRAFTING IMPLEMENT.
No. 177,257.  Patented May 9, 1876.
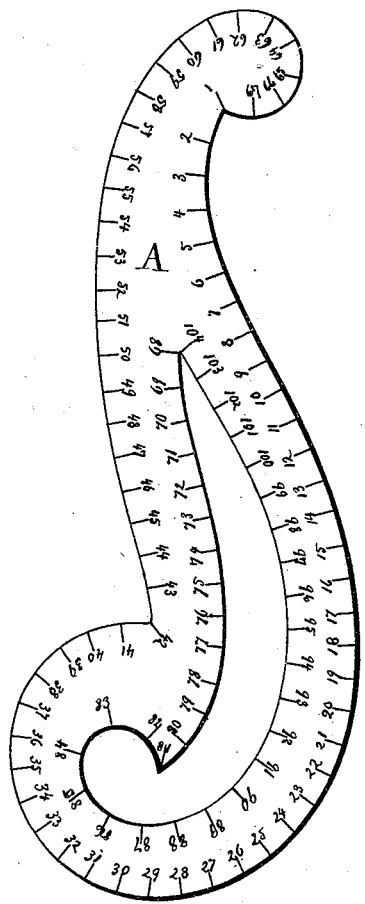
Fig. I.
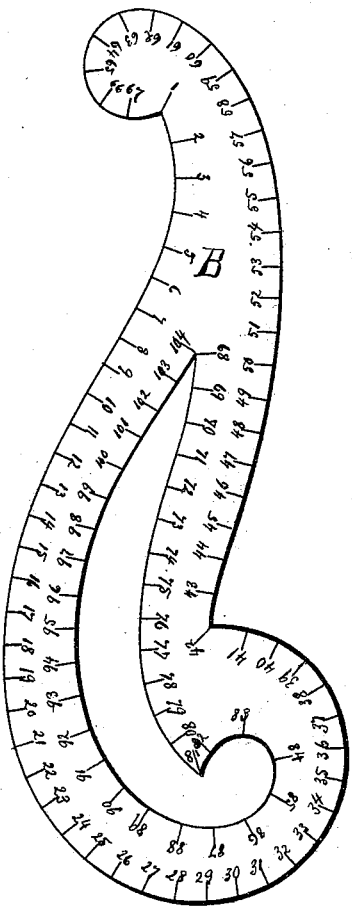
Fig. II.
Witnesses:
E. R. Lee.
C. H. Ridenour
William A. Lorenz Inventor,
by Munson & Philipp
his Attorneys.

UNITED STATES PATENT OFFICE.

WILLIAM A. LORENZ, OF NEW YORK, N. Y.

IMPROVEMENT IN DRAFTING IMPLEMENTS.

Specification forming part of Letters Patent No. 177,257, dated May 9, 1876; application filed April 21, 1876.

*To all whom it may concern:*

Be it known that I, WILLIAM A. LORENZ, of the city, county, and State of New York, have invented certain new and useful Improvements in Drafting Implements, of which the following, taken in connection with the accompanying drawings, is a full, clear, and exact description.

The invention relates to implements which are used in delineating lines, either in drafting or in laying out marks, which are to become guides for tools; and it consists of a pattern having curved working edges, such as curvilinears, curvographs, and the like, which pattern is provided upon one or both of its sides with graduations or other indicating-marks, whereby the portion of its edge which has been, or is to be, used in determining a line may be readily registered.

The application of the invention to a curvilinear or draftsman's curve-rule is shown in the drawing by two figures, which are respectively views of opposite sides of the implement.

In delineating a figure in which curvilinear lines occur it is usual to lay them out by means of a curve-rule, instead of sweeping many segments which joined will form the desired arc, and when these lines have been first traced in pencil-marks and require to be inked, or made stronger by retracing them, the curve-rule by which they were laid out must be moved over the pencil-line until the corresponding curve is found, when a permanent line may be made. The length of time expended in thus fitting a common curve-rule to the line desired to be strengthened, or adjusting it in proper position to reproduce a line which it has been used to lay out, is obviated by the use of my implement, which is provided all along its edge with indicating-marks or graduations numbered or lettered, so that the point at which a line made by said implement was begun, or any portion of it over which a line extends, may be readily ascertained and registered upon the drawing, thus enabling one to speedily reproduce such lines.

When a line made with such an implement is to be reproduced or gone over a second time, the point or graduations indicating its beginning or length are to be noted on the drawing in pencil, which point or points will, as is apparent, become an index, enabling the implement to be readily replaced in the exact position it occupied in making the line, thus aiding its reproduction in length, position, and shape with perfect exactness. When it is desired to reproduce such a line in a reversed position, as in figures having opposite sides alike, the implement may be provided on both its sides with coinciding points or graduations, which will enable one to place it in the proper position to produce the reversed counterpart of the said line.

In transcribing a drawing, its lines may thus be ascertained by fitting the edge of the implement to them, noting the relation of the indices to the line, and drawing the line upon the new drawing, in accordance with the position thus determined.

In laying out the ribs and other parts of the hulls of ships, or any other curved or irregular line or surface where reversed counterparts or duplicates are to be made, my invention will be found most useful.

While I have shown the implement as provided upon both its sides with the indicator, it is obvious that it may be marked upon one side only, or in like manner be marked upon its working edge.

The side which is exposed when the line is ascertained or drawn may be determined by a letter, as A or B, with which the implement may be provided; but odd numbers or letters on one side and even numbers, or simply letters upon the other, or any other mode of determining its position may be used.

What I claim, and desire to secure by Letters Patent, is—

A drafting implement having an irregular or curvilinear guiding-surface, provided with an indicator, substantially as and for the purpose specified.

In testimony whereof I have signed my name to this specification in the presence of two subscribing witnesses.

WILLIAM A. LORENZ.

Witnesses:
JOHN C. FOSTER,
H. T. MUNSON.